Oct. 17, 1950  R. ARLOW ET AL  2,526,449
APPARATUS FOR SCRAPING ANIMAL INTESTINES
Filed Feb. 15, 1947
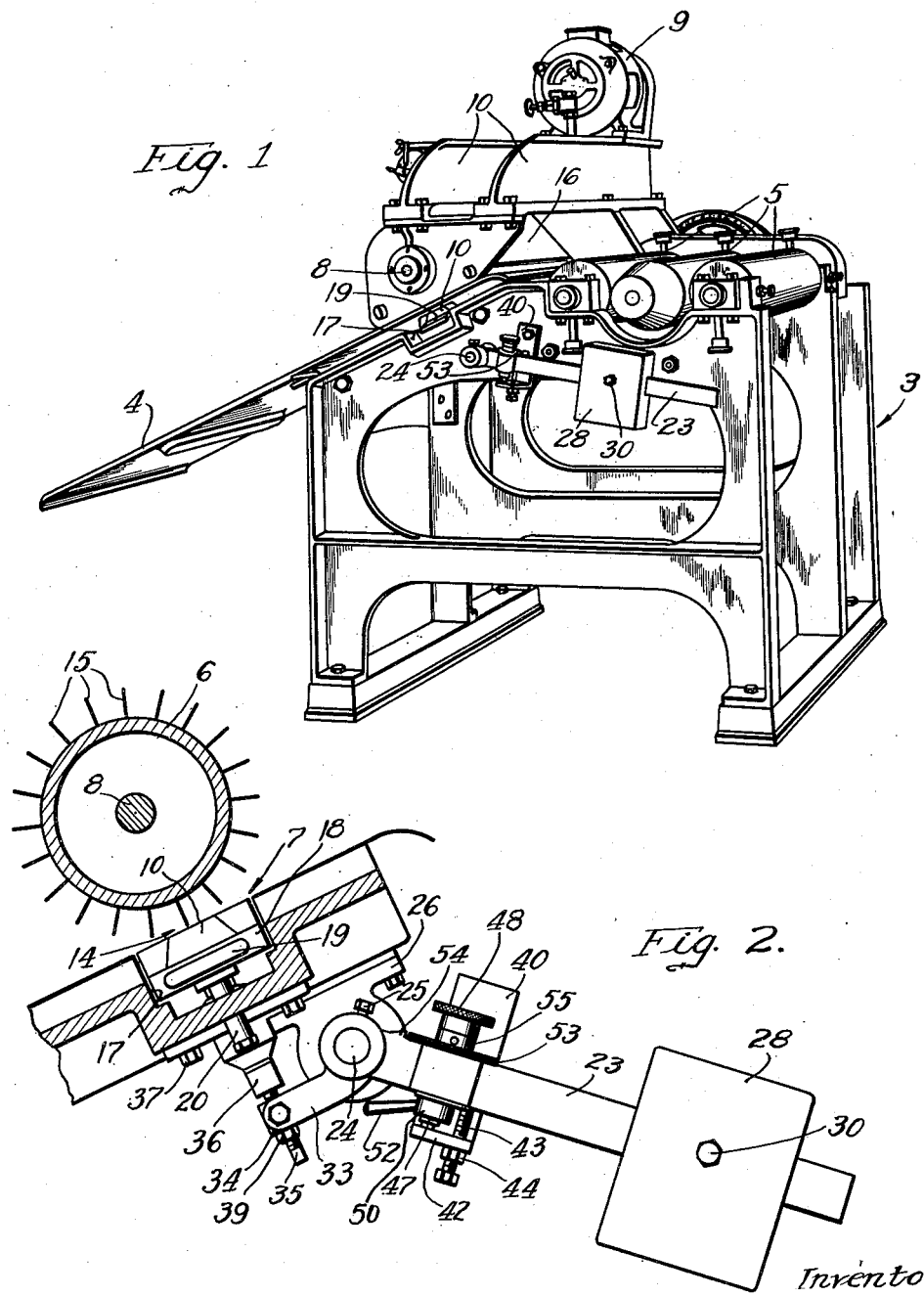
Inventors
ROBERT ARLOW
ARCHIE YOUNG
By Brown, Jackson, Boettcher & Dienner
Attorneys Patented Oct. 17, 1950

2,526,449

UNITED STATES PATENT OFFICE 2,526,449

APPARATUS FOR SCRAPING ANIMAL INTESTINES

Robert Arlow, Wellington, and Archie Young, Hastings, New Zealand, assignors to Oppenheimer Casing Company, Chicago, Ill., a corporation of Delaware Application February 15, 1947, Serial No. 728,888
In Great Britain February 19, 1946

2 Claims. (Cl. 17—43)

The present invention relates to an improvement in apparatus for scraping animal intestines to prepare the same for use as sausage casings.

Machines for scraping animal intestines for the purpose noted are known in the art and usually comprise a rotatable scraper drum having a plurality of blades with the drum being arranged in closely spaced relation with respect to a second drum or scraper block between which the animal intestines, or runners as they are referred to in the art, are passed to remove the mucous on the runners to render them suitable for use as sausage casings.

It is an object of the present invention to provide an apparatus of the character above indicated in which a scraper drum element and a scraper block element are mounted for relative movement to permit the passage therebetween of runners of varying thickness with means being provided for limiting movement of one element with respect to the other element to provide a desired predetermined minimum clearance between the elements. A further object of our invention is to arrange the scraper drum for rotational movement about a fixed horizontal axis with the scraper block being mounted for movement toward and away from the scraper drum with the aforementioned limiting means being associated with the scraper block. A more specific object is to provide a second limiting or stop means operable to effect increasing the minimum clearance between the scraper block and scraper drum with the first limiting or stop means in this arrangement being adjusted for the minimum clearance desired in the handling of any type of animal intestine or runner suitable for use as a sausage casing. A still more specific object is to provide the first and second limiting or stop means with means for effecting adjustment thereof so that the minimum clearances desired by the user may be readily accomplished.

The above and other objects of our invention will appear from the following detail description of a preferred embodiment of the invention.

In the drawing:

Figure 1 is a perspective view of an apparatus constructed in accordance with my invention; and Figure 2 is an enlarged side elevational view, with certain parts being shown in section, illustrating the manner in which the scraper drum and scraper block assembly of the machine shown in Figure 1 are arranged with respect to each other.

Referring now to Figure 1 of the drawing there is shown a scraping machine comprising a main frame 3 which supports a suitable feed board 4 and a plurality of wooden take-off rollers 5 rotatably mounted in suitable bearing means to extend transversely of the frame at the rear end of the machine. The center take-off roller 5 is adapted to be moved upwardly for the insertion of the ends of runners to be scraped between the several rollers which rollers are adapted to draw the runners upwardly of the feed board 4 and between, as shown in Figure 2 a scraper drum 6 and a scraper block assembly 7. The scraper drum 6 is mounted for rotation upon a shaft 8 which is journalled in suitable frame members carried by the main frame 3 to support the drum 6 for rotation about a fixed horizontal axis adjacent the upper end of the feed board 4 and above the scraper block assembly 7. An electric motor 9 supported by frame members 10 at the upper end of the machine provides a source of power for driving the scraper drum 6 and take-off rollers 5 through any suitable chain or belt driving means. Preferably the take-off rollers 5 are caused to be rotated at a considerably lower peripheral speed than the scraper drum 6. As previously mentioned the take-off rollers 5 draw the runners between a gap 14 between the blades 15 of the scraper drum 6 and the upper surface of a rubber scraper block 10 of the scraper block assembly 7 with the high peripheral speed of the scraper drum being effective to remove the mucous on the runners passing through the gap. The scraper drum 6 as shown in Figure 1 is preferably enclosed within a suitable sheet metal housing 16 with the housing being open at its bottom so that the blades 15 of the drum may cooperate with the upper surface of the scraper block 10 in scraping the runners passing through the gap 14. The machine as above described in its general arrangement is old and it is believed sufficient for an understanding of the present invention.

As will be clear from Figure 1 the frame elements of the main frame 3 at the forward upper end thereof are inclined at an appropriate angle for the support of feed board 4 and with the frame elements being formed to define a table having a transversely extending channel 17 in which the scraper block 7 is supported in a position directly below the scraper drum 6.

The scraper block assembly 7 as noted comprises the scraper block 10 made of rubber or other suitable composition mounted in a suitable metal carrier member 18 adapted to be disposed in the channel 17 of the table. A handle 19 is provided at one end of the carrier 18 to facilitate removal and replacement of the scraper block assembly in the channel 17. A plurality of set screws, one being shown at 20, have threaded engagement with the bottom wall defining the channel 17 and are provided to hold the carrier member 17 against sliding movement in the channel. The heads of these set screws are accessible from the undersurface of the channel to provide for the ready removal and insertion of the scraper block assembly. It is an important feature of the present invention to provide for adjustment of the scraper block assembly 7 to effect the desired clearance between the edges of the blades 15 extending lengthwise of drum 6 and the upper or scraping surface of the scraper block 10. In the embodiment of the invention herein disclosed this is accomplished by means of a lever 23 disposed at one side of the machine and which is secured at one end to a shaft 24 extending transversely of the table of the machine by means of a set screw 25. The shaft 24 is carried in one or more brackets 26 fixed to the underside of the table to support the shaft in a position somewhat rearwardly of the axis of the shaft 8 carrying the scraper drum 6. A weight 28 is adjustably fixed adjacent the opposite end of lever 23 by means of a set screw 30.

A pair of inwardly extending arms 33, one of which is shown in Figure 2, are mounted on shaft 24 beneath the table of the machine and are normally urged to rotate in a clockwise direction as viewed in Figure 2 by means of the lever 23 and weight 28 whereby the outer ends of the arms 33 are normally urged upwardly. The arms 33 at their forward ends each provide for the pivoted support of a nut 34 having threaded engagement with a push rod 35 extending upwardly through guide member 36 fixed by bolts 37 to the underside of the bottom wall of channel 17 to bear against the bottom surface of the scraper block assembly 7. The scraper block assembly while restrained against transverse movement in the channel 17 by the set screws 20 is free to move upwards, i. e., toward the scraper drum 6. Therefore, the upthrust of the pair of push rods 35 which results from the tendency of the weight 28 to rotate the shaft 24 and arms 33 as aforesaid is conveyed to the scraper block assembly. The push rods 35 are screw threaded in the pivoted nuts 34 carried by arms 33 to enable adjustment of the push rods to dispose the surface of the scraper block 10 in parallel relation with the blades 15 of the drum 6. The outer lower ends of the push rods 35 are preferably of square cross-section so that they may be conveniently threaded by a suitable tool. Also each of the push rods 35 is provided with a lock nut 39 to maintain the push rods in adjusted position.

In order to provide for adjustment of the gap 14 between the edges of blades 15 of drum 6 and the surface of scraper block 10 the apparatus is provided with an adjustable stop or limiting means comprising an angle bracket 40 which is secured to the side of the frame adjacent the end of lever 23 at its connection with the shaft 24, and in which a stop screw 43 has threaded engagement in the flange 42 thereof in position to engage the lower edge of lever 23. It will be evident that the lever 23 is free to move away from the stop screw upon downward movement of the scraper block assembly away from the scraper drum 6, but that by adjustment of the stop screw 43 a predetermined minimum gap may be provided between the outer edges of blades 15 and the surface of the scraper block 10. As shown a lock nut 44 is preferably provided to retain the stop screw 43 in adjusted position. If desired the stop screw 43 can be associated with a scale to enable adjustment of the gap 14 as desired. However, it is preferable to provide for the latter purpose a second stop or limiting means comprising a stop screw 47 having a knurled operating head 48 at its upper end. The stop screw 47 is carried by the lever 23 and extends therethrough with its lower end having engagement with the upper surface of flange 42 of bracket 40. A lock nut 50 having an operating handle 52 has threaded engagement with the lower end portion of stop screw 47 for maintaining the latter in a selected adjusted position. A graduated dial 53 is associated with the stop screw 47 with a pointer 54 for the dial being formed integral with the upper edge of lever 23. A grub screw 55 is provided for releasably securing the graduated dial with respect to stop screw 47. The above described second stop or limiting means is provided so that if desired the minimum clearance between the scraper drum and scraper block may be readily increased as when the clearance or gap provided by the first stop or limiting means is less than that desired. Generally runners in being scraped are passed through more than one machine or several times through the same machine. When the runners are to be passed several times through the same machine, the first stop or limiting means may be set for the gap distance required in the last passage of the runners through the machine and with the second stop or limiting means providing for adjustment of the gap clearance to provide for initial coarser scraping of the runners. The pair of stop means also have utility in enabling the machine to be set by means of the first stop or limiting means to the minimum clearance desired for the handling of runners with the second stop or limiting means providing an adjustment for handling different types of runners with which it may be desirable to use a greater gap clearance.

In initially adjusting the apparatus, the push rods 35 as previously described are manipulated to bring the surface of the scraper block in parallel relation with respect to the edges of the several blades 15 of the scraping drum 6. The lock nut 44 is loosened whereupon the stop screw 43 is adjusted to provide the desired minimum gap between the scrap drum 6 and scraper block 10 as by means of a feeler gauge. Generally a gap of about .008 inch is employed for most runners. The lock nut 44 is then made fast which thus provides a minimum gap clearance for the machine. When the machine is so set the graduated dial 53 may be set with respect to the pointer 54 to indicate 0 by loosening grub screw 55 after which the screw 55 is then made fast to key the dial to the stop screw 47. If it is desired to increase the working gap the weight 28 is lifted and the lock nut 50 is loosened. The stop screw 47 may then be rotated by grasping of the knurled head 48 in a direction to advance the screw 47 a desired amount as indicated by the graduations on dial 53. After the desired adjustment the lock nut 50 is tightened. Upon release of weight 28 engagement of the advanced end of stop screw 47 with flange 42 of bracket 40 positions the push rods 35 to provide for increasing of gap 14 an amount as indicated by the adjusted position of dial 53. The machine will then function to provide the minimum clearance or gap as determined by the stop screw 41.

It will be observed that the scraper block 10 is of dovetail cross-section with the greatest width being at the bottom of the block and that the carrier is of complementary cross-section for purposes of retaining the block in the carrier.

It will be observed if desired that the lever 23 and weight 28 could extend forwardly of the machine in which case the arms 33 connected to the push rods 35 would extend rearwardly and in which construction the shaft 24 would be disposed to lie forwardly of the scraper block assembly.

The above and other modifications and re-arrangements will be readily apparent to those skilled in the art in view of which it will be understood that while the embodiment herein disclosed is preferred the invention is not limited thereto.

We claim:

1. An apparatus of the character described comprising a frame having a pair of laterally spaced vertical side walls, a scraper drum mounted for rotation about a fixed horizontal axis extending transversely between said side walls, a scraper block disposed below said scraper drum, a shaft extending transversely of said side walls below said scraper block, a lever in juxtaposition of one of the side walls of said frame, said lever being fixed at one end to said shaft and having a weight at the other end thereof, arm means mounted on said shaft and linkage means connected between said arm means and said scraper block whereby said weight is adapted to urge normally said scraper block in a direction toward said drum, and adjustable stop means comprising an angle bracket having an arm portion projecting laterally outwardly of said one side wall of said frame and disposed below said lever, and a stop screw threaded in said arm portion of said angle bracket in position to be engaged by said lever for limiting movement of said scraper block toward said scraper drum to provide a minimum clearance therebetween.

2. An apparatus of the character described comprising a frame having a pair of laterally spaced vertical side walls, a scraper drum mounted for rotation about a fixed horizontal axis extending transversely between said side walls, a scraper block disposed below said scraper drum, a shaft extending transversely of said side walls below said scraper block, a lever in juxtaposition of one of the side walls of said frame, said lever being fixed at one end to said shaft and having a weight at the other end thereof, arm means mounted on said shaft and linkage means between said arm means and said scraper block whereby said weight is adapted to urge normally said scraper block in a direction toward said drum, an angle bracket having an arm portion projecting laterally outwardly of said one side wall of said frame below said lever, a stop screw threaded in said arm portion of said angle bracket in position for engaging said lever to define a first stop means for limiting movement of said scraper block toward said scraper drum to provide for maintaining a minimum clearance therebetween, and a second adjustable stop screw threaded in said lever and engageable with said arm portion of said angle bracket to provide for increasing the minimum clearance between said scraper block and said scraper drum.

ROBERT ARLOW.
ARCHIE YOUNG.

REFERENCES CITED

The following references are of record in the file of this patent:

UNITED STATES PATENTS

| Number | Name | Date |
| --- | --- | --- |
| 1,941,118 | Thompson et al. | Dec. 26, 1933 |

FOREIGN PATENTS

| Number | Country | Date |
| --- | --- | --- |
| 108,222 | Australia | Aug. 8, 1939 |